(12) United States Patent
Hallivuori et al.

(10) Patent No.: US 10,652,140 B2
(45) Date of Patent: May 12, 2020

(54) SYSTEM AND A METHOD FOR CONTROLLING MANAGEMENT PROCESSES DIRECTED TO A LINK AGGREGATION GROUP

(71) Applicant: CORIANT OY, Espoo (FI)

(72) Inventors: Ville Hallivuori, Espoo (FI);
Juha-Petteri Nieminen, Espoo (FI);
Mikko Vänttinen, Helsinki (FI)

(73) Assignee: CORIANT OY (FI)

( * ) Notice: Subject to any disclaimer, the term of this patent is extended or adjusted under 35 U.S.C. 154(b) by 0 days.

(21) Appl. No.: 15/773,402

(22) PCT Filed: Nov. 3, 2015

(86) PCT No.: PCT/FI2015/050753
§ 371 (c)(1),
(2) Date: May 3, 2018

(87) PCT Pub. No.: WO2017/077169
PCT Pub. Date: May 11, 2017

(65) Prior Publication Data
US 2018/0316605 A1    Nov. 1, 2018

(51) Int. Cl.
*H04L 12/28*      (2006.01)
*H04L 12/709*     (2013.01)
(Continued)

(52) U.S. Cl.
CPC ........ *H04L 45/245* (2013.01); *H04L 12/4641* (2013.01); *H04L 45/502* (2013.01);
(Continued)

(58) Field of Classification Search
CPC . H04L 12/4641; H04L 45/245; H04L 45/502; H04L 45/745; H04L 47/225; Y02D 50/30
See application file for complete search history.

(56) References Cited

U.S. PATENT DOCUMENTS

| | | | | |
|---|---|---|---|---|
| 2008/0267184 A1* | 10/2008 | Arisoylu | ............. | H04L 41/0896 370/391 |
| 2013/0003549 A1* | 1/2013 | Matthews | ........... | H04L 41/0668 370/235 |
| 2017/0078193 A1* | 3/2017 | Cui | ..................... | H04L 12/6418 |

FOREIGN PATENT DOCUMENTS

EP    2 621 136 A2    7/2013

OTHER PUBLICATIONS

International Search Report, dated Apr. 25, 2016, from corresponding PCT/FI2015/050753 application.

* cited by examiner

*Primary Examiner* — Phuc H Tran (57) ABSTRACT

A transmission control system for controlling management processes, such as shaping, is presented. The management processes are directed to data streams that are parts of data traffic transmitted via a link aggregation group having egress ports in separate functional entities of a network element. For each data frame of the data traffic, it is detected whether the data frame belongs to any of the data streams. Data frames belonging to none of the data streams are forwarded so that these data frames are distributed between the functional entities according to a link aggregation rule. A management rule is maintained for indicating, for each of the data streams, a stream-specific functional entity that runs each management process directed to the data stream. Each data frame belonging to one of the data streams is forwarded to the appropriate stream-specific functional entity in accordance with the management rule.

23 Claims, 4 Drawing Sheets (51) Int. Cl.
*H04L 12/46* (2006.01)
*H04L 12/723* (2013.01)
*H04L 12/741* (2013.01)
*H04L 12/815* (2013.01)

(52) U.S. Cl.
CPC .......... *H04L 45/745* (2013.01); *H04L 47/225* (2013.01); *Y02D 50/30* (2018.01)

SYSTEM AND A METHOD FOR CONTROLLING MANAGEMENT PROCESSES DIRECTED TO A LINK AGGREGATION GROUP

FIELD OF THE DISCLOSURE

The disclosure relates generally to controlling data traffic. More particularly, the disclosure relates to a method, to a system, and to a computer program for controlling management processes, such as shaping, in conjunction with link aggregation. Furthermore, the disclosure relates to a network element such as a router.

BACKGROUND

In conjunction with data transfer there is often a need to bundle two or more data links to constitute a link aggregation group "LAG". In many cases, one or more management processes need to be directed to a data stream that is a part of data traffic that is transmitted via a link aggregation group having egress ports in multiple functional entities of a network element. The data traffic may consist of data frames that can be for example Internet Protocol "IP" packets, Ethernet frames, or some other data entities. The network element can be for example an Internet Protocol "IP" router, a MultiProtocol Label Switching "MPLS" switch, a packet optical switch, an Ethernet switch, and/or a software-defined networking "SDN" controlled network element. The above-mentioned functional entities can be for example line cards or other entities of the network element which comprise the egress ports.

The management processes may comprise for example shaping for controlling the temporal rate profile of the data stream under consideration, i.e. to control the transmission rate and/or bursts of the data stream. For another example, the management processes may comprise deep packet inspection "DPI" for monitoring the content of the data stream. Furthermore, the management processes may comprise intrusion detection for monitoring the integrity of the data stream, e.g. for detecting a situation where unwanted data frames have been included into the data stream by an unauthorized malicious party.

The above-mentioned shaping, for example, can be configured on per Virtual Local Access Network "LAN" level or per MPLS Label Switched Path "LSP" level, and it may happen that a data stream to be shaped and representing a VLAN or a LSP is transmitted via egress ports located in multiple line cards or other functional entities comprising the egress ports. Traditionally, shapers are implemented in functional entities comprising the egress ports and this means that the desired shaping rate can be exceeded if the shaping in each functional entity works independently of the shaping in the other functional entities. For example, if four functional entities are used for transmitting a data stream to be shaped to be at most 100 Mbps and the shaping rate is set to be 100 Mbps in each of these four functional entities, the sum of the transmission rates of these functional entities can be up to 400 Mbps which is four times too much. On the other hand, if the shaping rate is set to be 25 Mbps in each of these four functional entities, the shaping is too restrictive during time periods when the whole data stream happens to flow via only one, two, or three of the four functional entities.

One approach for solving the above-described technical problem is such that shapers and/or other management devices located in multiple functional entities such as line cards are configured to communicate with each other so that the aggregate of the sub-streams sent via different ones of the functional entities is treated in an appropriate way. A challenge related to this approach is that data exchange between the shapers and/or other management devices located in the different ones of the functional entities would require a big amount of short-delay data traffic between these functional entities. In many cases it is not feasible, or not even possible, to arrange such data exchange between the functional entities. Another approach for solving the above-described technical problem is to carry out the shaping and/or other management processes in a place where the whole data stream under consideration is present. This place can be for example a switch fabric which distributes the data stream to the functional entities. This approach is however problematic with multicast "MC" traffic. Furthermore, in cases where there are many switch fabrics for load balancing, we have the problem that the switch fabrics should be configured to communicate with each other at a high rate and with a small delay.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts in a simplified form as a prelude to a more detailed description of exemplifying embodiments of the invention.

In accordance with the invention, there is provided a new transmission control system for controlling one or more management processes. Each management process can be for example shaping, deep packet inspection "DPI", or intrusion detection. The one or more management processes are directed to one or more data streams that are parts of data traffic transmitted via a link aggregation group "LAG" having egress ports in separate functional entities, e.g. line cards, of a network element. A transmission control system according to the invention comprises:

- a detection mechanism for detecting, for each of data frames belonging to the above-mentioned data traffic, whether the data frame under consideration belongs to any of the data streams, and
- a forwarding-control mechanism for controlling the data frames belonging to none of the data streams to be forwarded to the functional entities so that these data frames are distributed between the functional entities according to a link aggregation rule related to the link aggregation group.

The forwarding-control mechanism is further configured to:

- maintain a management rule that indicates, for each of the data streams, a stream-specific functional entity that is one of the functional entities and is configured to run each of one or more management processes to be directed to the data stream under consideration, and
- control, in accordance with the management rule, the data frames belonging to one of the data streams to be forwarded to the stream-specific functional entity related to the one of the data streams.

As each of the data streams is directed to a functional entity that is related to the data stream under consideration, one or more management processes, such as e.g. shaping and/or deep packet inspection and/or intrusion detection, can be directed to the data stream even if the data stream is a part of the data traffic transmitted via the link aggregation group "LAG" having egress ports in many of the functional entities. This approach according to the invention is applicable to cases where data streams to be shaped and/or otherwise processed can be transmitted so that none of these data streams needs to be divided between two or more of the functional entities. This is a typical case on e.g. mobile back-haul where point-to-point VLANs and/or LSPs may be transported over link aggregation interface and via a larger Ethernet network. Thus, the above-presented approach is based on the utilization of the above described typical case.

In accordance with the invention, there is provided also a new network element that can be for example an Internet Protocol "IP" router, a multiprotocol label switching "MPLS" switch, a packet optical switch, an Ethernet switch, and/or a software-defined networking "SDN" controlled network element. A network element according to the invention comprises:

functional entities, e.g. line cards, capable of transferring data between each other, at least one of the functional entities being capable of receiving data from a data transfer network and at least two of the functional entities being capable of transmitting data to the data transfer network and running one or more management processes directed to one or more data streams each being a part of data traffic transmitted via a link aggregation group having egress ports in multiple ones of the two or more functional entities, and a transmission control system according to the invention for controlling the one or more management processes.

In accordance with the invention, there is provided also a new method for controlling one or more management processes directed to one or more data streams each being a part of data traffic transmitted via a link aggregation group having egress ports in multiple functional entities of a network element. A method according to the invention comprises:

maintaining a management rule that indicates, for each of the data streams, a stream-specific functional entity that is one of the functional entities and is configured to run each of one or more management processes to be directed to the data stream under consideration, detecting, for each of data frames belonging to the above-mentioned data traffic, whether the data frame under consideration belongs to any of the data streams, controlling the data frames belonging to none of the data streams to be forwarded to the functional entities so that these data frames are distributed between the functional entities according to a link aggregation rule related to the link aggregation group, and controlling, in accordance with the management rule, the data frames belonging to one of the data streams to be forwarded to the stream-specific functional entity related to the one of the data streams.

In accordance with the invention, there is provided also a new computer program for controlling one or more management processes directed to one or more data streams each being a part of data traffic transmitted via a link aggregation group having egress ports in multiple functional entities of a network element. A computer program according to the invention comprises computer executable instructions for controlling a programmable processing system to:

maintain a management rule that indicates, for each of the data streams, a stream-specific functional entity that is one of the functional entities and is configured to run each of one or more management processes to be directed to the data stream under consideration, detect, for each of data frames belonging to the above-mentioned data traffic, whether the data frame under consideration belongs to any of the data streams, control the data frames belonging to none of the data streams to be forwarded to the functional entities so that these data frames are distributed between the functional entities according to a link aggregation rule related to the link aggregation group, and control, in accordance with the management rule, the data frames belonging to one of the data streams to be forwarded to the stream-specific functional entity related to the one of the data streams.

In accordance with the invention, there is provided also a new computer program product. The computer program product comprises a non-volatile computer readable medium, e.g. a compact disc "CD", encoded with a computer program according to the invention.

A number of exemplifying and non-limiting embodiments of the invention are described in accompanied dependent claims.

Various exemplifying and non-limiting embodiments of the invention both as to constructions and to methods of operation, together with additional objects and advantages thereof, will be best understood from the following description of specific exemplifying embodiments when read in connection with the accompanying drawings.

The verbs "to comprise" and "to include" are used in this document as open limitations that neither exclude nor require the existence of also un-recited features.

The features recited in the accompanied dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE FIGURES

Exemplifying and non-limiting embodiments of the invention and their advantages are explained in greater detail below with reference to the accompanying drawings, in which.

DESCRIPTION OF EXEMPLIFYING AND NON-LIMITING EMBODIMENTS

The specific examples provided in the description below should not be construed as limiting the scope and/or the applicability of the accompanied claims. Lists and groups of examples provided in the description below are not exhaustive unless otherwise explicitly stated.

Figure 1:
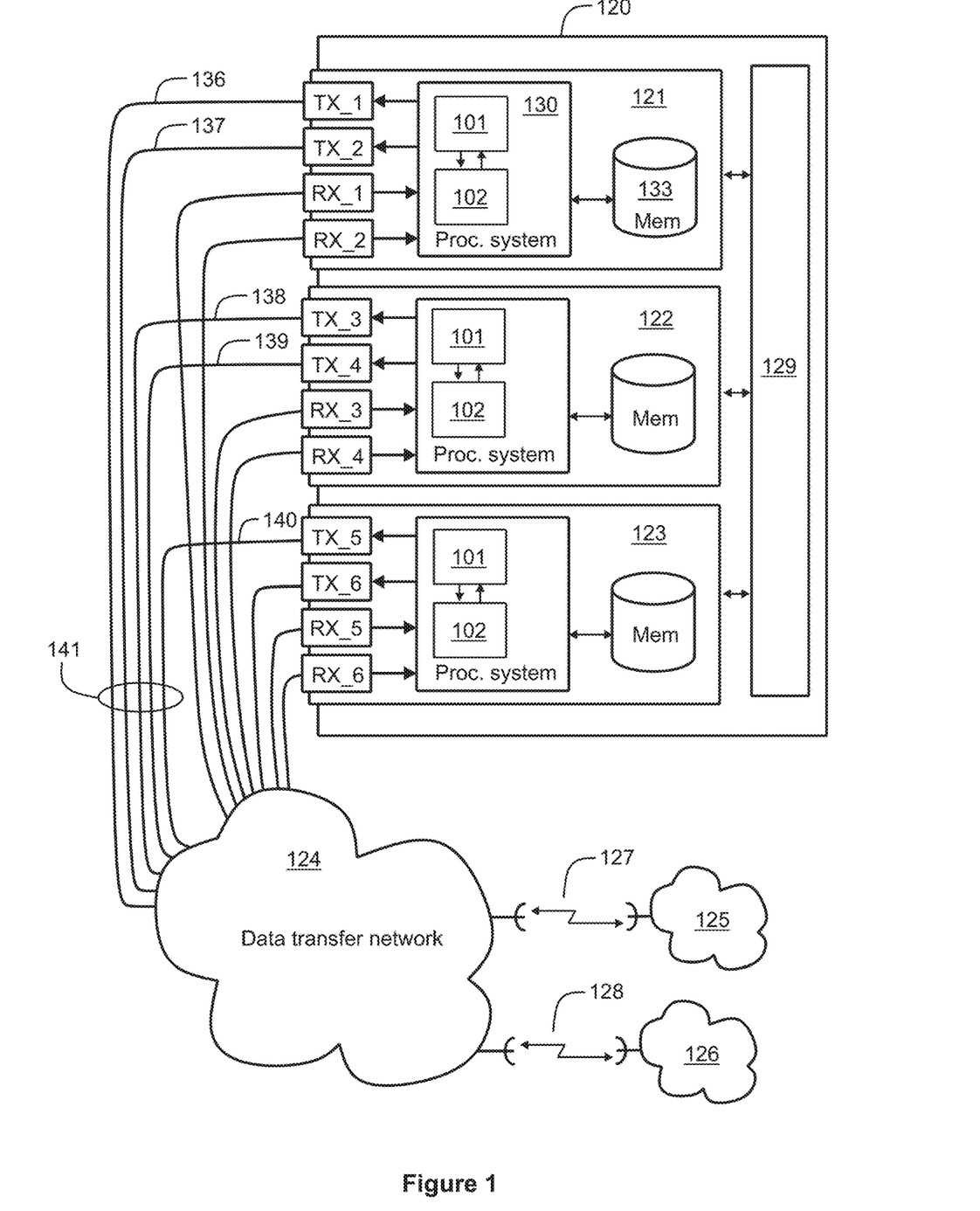
FIG. 1 shows a schematic illustration of a network element comprising a transmission control system according to an exemplifying and non-limiting embodiment of the invention.

FIG. 1 shows a schematic illustration of a network element 120 according to an exemplifying and non-limiting embodiment of the invention. The network element 120 can be for example an Internet Protocol "IP" router, a multiprotocol label switching "MPLS" switch, a packet optical switch, an Ethernet switch, and/or a software-defined networking "SON" controlled network element. The network element 120 has a modular structure so that the network element comprises functional entities 121, 122, and 123. Furthermore, the network element 120 may comprise functional entities which are not shown in FIG. 1. The functional entities 121-123 are capable of receiving data from a data transfer network 124, transferring data between each other, and transmitting data to the data transfer network 124. The data transfer network 124 can be for example a metropolitan area Ethernet. For the sake of illustrative purposes, it is assumed that the data transfer network 124 is connected via data transfer links 127 and 128 to data systems 125 and 126 each of which can be a single network element or a network constituted by interconnected network elements. Each of the data transfer links 127 and 128 can be e.g. a radio link.

In the exemplifying case illustrated in FIG. 1, the functional entities 121-123 are line cards of the network element 120. In a general case, each functional entity can be for example a line card, a part of a line card such as an egress-side of the line card, a single egress port, or a group of two or more egress ports. It is also possible that a network element is a cluster of separate interconnected routers and/or switches, and in this case each router and/or switch can represent a functional entity.

Each of the functional entities 121-123 of the network element 120 comprises a processing system and a memory for running one or more data transfer protocols and one or more other functionalities of the functional entity under consideration. For example, the functional entity 121 comprises a processing system 130 and a memory 133. The data transfer protocols may comprise for example the Internet Protocol "IP", the Ethernet protocol, and/or the multiprotocol label switching "MPLS". The processing system of each functional entity may comprise one or more processor circuits, each of which can be a programmable processor circuit provided with appropriate software, a dedicated hardware processor such as for example an application specific integrated circuit "ASIC", or a configurable hardware processor such as for example a field programmable gate array "FPGA". The memory of each functional entity may comprise one or more memory circuits each of which can be e.g. a random access memory circuit "RAM" or a content access memory circuit "CAM". The functional entities 121-123 are communicatively interconnected via a connection module 129 that may comprise for example a backplane providing full-mesh connections between the functional entities 121-123, or one or more switch fabrics for communicatively interconnecting the functional entities 121-123.

In the exemplifying network element 120 illustrated in FIG. 1, the functional entity 121 comprises ingress ports RX_1 and RX_2 and egress ports TX_1 and TX_2, the functional entity 122 comprises ingress ports RX_3 and RX_4 and egress ports TX_3 and TX_4, and the functional entity 123 comprises ingress ports RX_5 and RX_6 and egress ports TX_5 and TX_6. Furthermore, each functional entity may comprise ingress ports and/or egress ports which are not shown in FIG. 1. As shown in FIG. 1, the egress ports TX_1-TX_5 are connected to data transfer links 136, 137, 138, 139, and 140, respectively. Each of these data transfer links 136-140 can be for example a fiber link, a copper link, or a radio link.

For the sake of illustrative purposes, it is assumed that the data transfer links 136-140 are arranged to constitute a link aggregation group "LAG" 141 and that a data traffic DT transmitted via the link aggregation group 141 comprises a data stream DS_1 directed to the data system 125 and a data stream DS_2 directed to the data system 126. Furthermore, the data traffic DT may comprise other data traffic components in addition to the above-mentioned data streams DS_1 and DS_2. Furthermore, it is assumed that one or more management processes are to be directed to the data stream DS_1 and one or more management processes are to be directed to the data stream DS_2. The term "data stream" is to be understood in the broad sense so that even a single data frame can be considered to constitute a data stream, i.e. a data stream does not necessarily comprise a plurality of sequentially transferred data frames. Each management process can be for example shaping for controlling the temporal rate profile of the data stream under consideration, deep packet inspection "DPI" for monitoring the content of the data stream, or intrusion detection for monitoring the integrity of the data stream. It is also possible that a management process is a Transmission Control Protocol "TCP" optimization proxy process for optimizing TCP-transfer over a transmission path having a long delay, e.g. a transmission path comprising a satellite link.

The network element 120 comprises a transmission control system according to an exemplifying and non-limiting embodiment of the invention for controlling the management processes directed to the data streams DS_1 and DS_2. The transmission control system comprises a detection mechanism for detecting whether a received data frame belongs to the data traffic DT transferred by the above-mentioned link aggregation group 141 and for detecting whether the data frame under consideration belongs to either one of the data streams DS_1 and DS_2. In some exemplifying cases, all the received data frames belong to the above-mentioned data traffic DT transferred by the link aggregation group 141. In these exemplifying cases, the detection mechanism does not need to detect whether a received data frame belongs to the data traffic DT. The transmission control system comprises a forwarding-control mechanism for controlling each received data frame to be forwarded to an appropriate one of the functional entities. In this context, the term "forwarding" encompasses also a situation in which a received data frame is transmitted by the same functional entity at which the data frame has been received. For example, it may happen that a data frame is received at the functional entity 121 and the forwarding-control mechanism decides that this data frame is transmitted via the egress port TX_1 or TX_2 of the functional entity 121, i.e. the forwarding-control mechanism controls the data frame to be "forwarded" to the functional entity 121.

In the exemplifying network element 120 illustrated in FIG. 1, the detection mechanism and the forwarding-control mechanism are implemented in a distributed way in the functional entities 121-123 so that the detection mechanism and the forwarding-control mechanism are arranged to process data frames received at these functional entities. The detection and forwarding-control mechanisms are implemented with the processing systems and memories of the functional entities 121-123. In FIG. 1, the detection mechanism is depicted with blocks 101 and the forwarding-control mechanism is depicted with blocks 102. In exemplifying cases where the connection module 129 comprises one or more switch fabrics, the detection and forwarding-control mechanisms can be implemented in the one or more switch fabrics.

The operation of the transmission control system of the network element 120 is described below with reference to FIG. 2. The detection mechanism 101 is configured to detect whether a data frame 242 under consideration belongs to data traffic DT transferred by the link aggregation group 141. Furthermore, the detection mechanism 101 is configured to detect whether the data frame 242 belongs to the data stream DS_1 or DS_2. The detection whether the data frame 242 is a part of the data traffic DT can be based on data related the data frame 242. The data related to the data frame 242 may comprise for example data read from the data frame 242 and/or data that is otherwise related to the data frame 242, e.g. a result of a routing algorithm such as a result of an IP-routing algorithm obtained for the data frame 242, or an indicator of the ingress port or the functional entity at which the data frame 242 has been received. The detection mechanism 101 can be configured to direct for example a hash function to the data related to the data frame 242 and to detect, on the basis of the result of the hash function, whether the data frame 242 belongs to the data traffic DT. Hereinafter, it is assumed that the data frame 242 belongs to the data traffic DT. The detection whether the data frame 242 belongs to the data stream DS_1 or DS_2 can be based on data read from or otherwise related to the data frame 242. The data read from the data frame 242 may comprise for example an Internet Protocol destination address "IP DA", an Internet Protocol source address "IP SA", an indicator of a label switched path "LSP" of the multiprotocol label switching "MPLS", and/or an indicator of a virtual local access network "VLAN". The detection whether the data frame 242 belongs to the data stream DS_1 or DS_2 can be based on for example the indicator of the VLAN or LSP. In this exemplifying case, data frames representing a given VLAN or LSP constitute one of the data streams DS_1 and DS_2.

Figure 2:
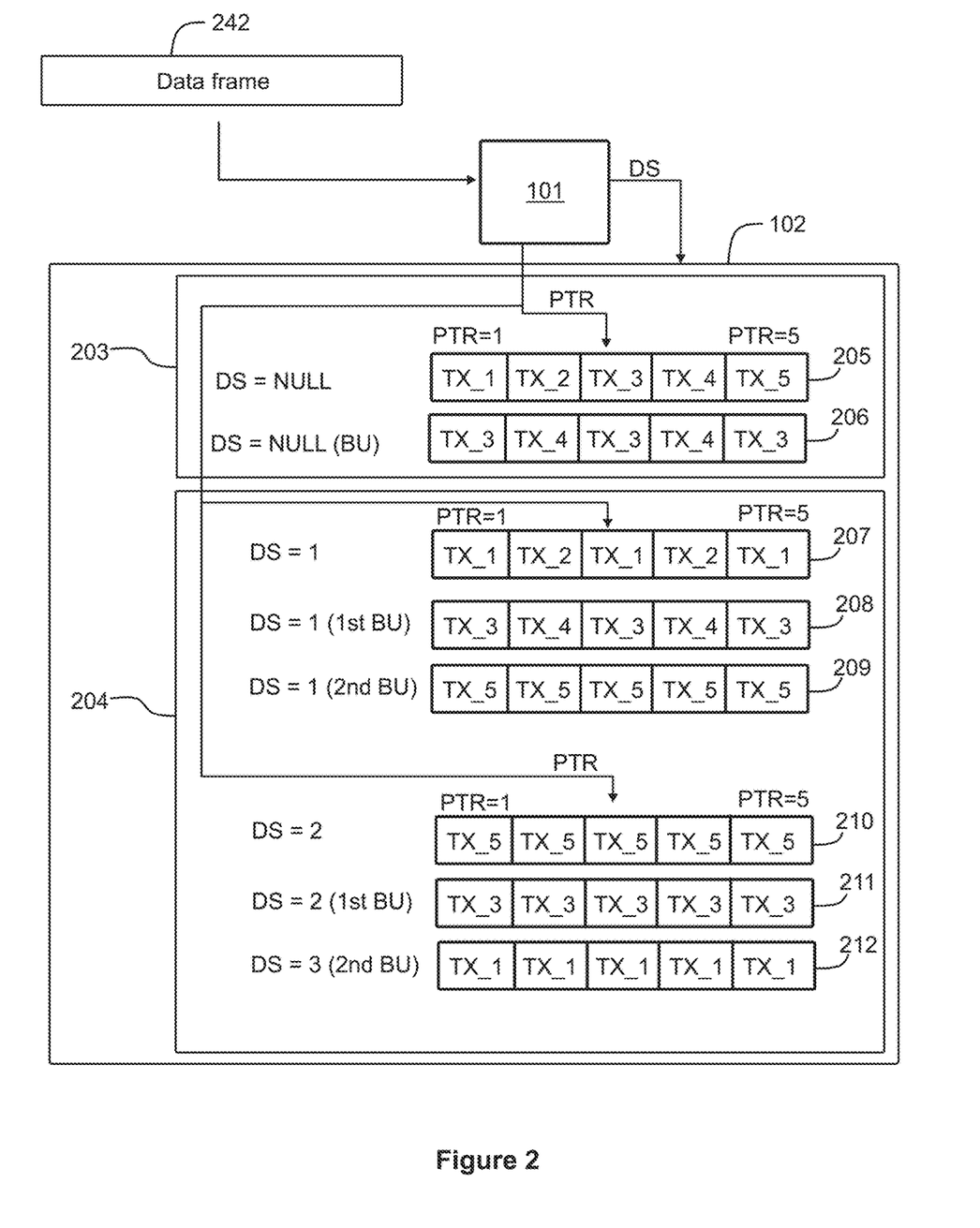
FIG. 2 illustrates the operation of a transmission control system according to an exemplifying and non-limiting embodiment of the invention.

In the exemplifying case illustrated in FIG. 2, the detection mechanism 101 is configured to produce an indicator DS which is NULL if the data frame 242 belongs to none of the data streams DS_1 and DS_2, which is 1 if the data frame 242 belongs to the data stream DS_1, and which is 2 if the data frame 242 belongs to the data stream DS_2. Furthermore, the detection mechanism 101 is configured to produce a pointer PTR than can be for example the result of a hash function for determining whether the data frame 242 belongs to the data traffic DT that is transferred by the link aggregation group 141 illustrated in FIG. 1. In this exemplifying case, the pointer PTR can be 1, 2, 3, 4 or 5, or the pointer PTR can have some other predetermined discrete values.

The forwarding-control mechanism 102 is configured to control data frames which belong to the data traffic DT but neither of the data streams DS_1 and DS_2 to be forwarded to the functional entities 121-123 so that these data frames are distributed between the functional entities according to a link aggregation rule 203 related to the link aggregation group 141 illustrated in FIG. 1. In the exemplifying case illustrated in FIG. 2, the link aggregation rule 203 is implemented with a link aggregation lookup table 205. In an exemplifying situation where the data frame 242 belongs to the data traffic DT but neither of the data streams DS_1 and DS_2, i.e. DS=NULL, the forwarding-control mechanism 102 retrieves an egress port identifier from the link aggregation lookup table 205 on the basis of data related to the data frame 242. In this exemplifying case, the above-mentioned pointer PTR represents the data related to the data frame 242. In the exemplifying situation shown in FIG. 2, the pointer PTR is 3, and thus the data frame 242 is forwarded to the egress port TX_3 that belongs to the functional entity 122 shown in FIG. 1. The link aggregation rule 203 comprises advantageously one or more backup link aggregation lookup tables each of which can be used in lieu of the link aggregation lookup table 205 in situations where one or more of the functional entities cannot be used for transmitting data, i.e. the one or more of the functional entities is/are faulty or otherwise incapable of transmitting data, one or more of the data transfer links connected to the one or more functional entities is/are faulty or otherwise incapable of transferring data, and/or the receiving end is incapable of receiving data from the one or more functional entities. In the exemplifying case illustrated in FIG. 2, the link aggregation rule 203 comprises one backup "BU" link aggregation lookup table 206 which is used in situations where the functional entity 121, i.e. one or both of the egress ports TX_1 and TX_2, cannot be used for transmitting data.

The forwarding-control mechanism 102 is configured to maintain a management rule 204 that indicates, for each of the data streams DS_1 and DS_2, a stream-specific functional entity that is one of the functional entities 121-123 shown in FIG. 1. Each stream specific functional entity is configured to run each of one or more management processes, e.g. shaping, to be directed to the data stream under consideration. The forwarding-control mechanism 102 is configured to control each data frame belonging to the data stream DS_1 or DS_2 to be forwarded to the stream-specific functional entity related to the data stream under consideration. In the exemplifying case illustrated in FIG. 2, the management rule 204 is implemented with stream-specific management lookup tables 207 and 210 so that the stream-specific management lookup table 207 relates to the data stream DS_1 and the stream-specific management lookup table 210 relates to the data stream DS_2. The forwarding-control mechanism 102 is configured to retrieve, for each data frame belonging to the data stream DS_1 or DS_2, an egress port identifier from the stream-specific management lookup table 207 or 210 corresponding to the data stream under consideration on the basis of data related to the data frame under consideration. In this exemplifying case, the above-mentioned pointer PTR represents the data related to the data frame 242. As can be seen from FIG. 2, the stream-specific management lookup table 207 contains egress port identifiers which refer to the egress ports TX_1 and TX_2 that belong to the functional entity 121 shown in FIG. 1. Thus, the data stream DS_1 is processed, e.g. shaped, and transmitted by the functional entity 121. Correspondingly, the stream-specific management lookup table 210 contains egress port identifiers which refer to the egress port TX_5 that belongs to the functional entity 123 shown in FIG. 1. Thus, the data stream DS_2 is processed, e.g. shaped, and transmitted by the functional entity 123. In an exemplifying situation where the data frame 242 belongs to the data stream DS_1, i.e. DS=1, the forwarding-control mechanism 102 retrieves the egress port identifier from the stream-specific management lookup table 207 on the basis of the pointer PTR. In the exemplifying situation shown in FIG. 2, the pointer PTR is 3, and thus the data frame 242 is forwarded to the egress port TX_1 that belongs to the functional entity 121 shown in FIG. 1. Correspondingly, in another exemplifying situation where the data frame 242 belongs to the data stream DS_2, i.e. DS=2, the forwarding-control mechanism 102 retrieves an egress port identifier from the stream-specific management lookup table 210 on the basis of the pointer PTR. In this exemplifying situation, the data frame 242 is forwarded to the egress port TX_5 that belongs to the functional entity 123 shown in FIG. 1.

The management rule 204 indicates advantageously, but not necessarily, a group of backup entities for each of the data streams DS_1 and DS_2. Each of the backup entities is one of the functional entities 121-123. Each of the backup entities related to the data stream DS_1 is configured to run each of the one or more management processes, e.g. shaping, to be directed to the data stream DS_1, and each of the backup entities related to the data stream DS_2 is configured to run each of the one or more management processes to be directed to the data stream DS_2. The management rule 204 indicates a backup order in which the backup entities related to the data stream DS_1 are to be used in lieu of the functional entity 121 for processing and transmitting the data stream DS_1, and a backup order in which the backup entities related to the data stream DS_2 are to be used in lieu of the functional entity 123 for processing and transmitting the data stream DS_2. The forwarding-control mechanism 102 is configured to control, in response to a switchover to a backup entity, data frames belonging to the appropriate data stream to be forwarded to the backup entity in accordance with the management rule 204. In the exemplifying case illustrated in FIG. 2, the management rule 204 comprises stream-specific backup lookup tables 208 and 209 related to the data stream DS_1 so that the stream-specific backup lookup table 208 is a primary backup lookup table "$1^{st}$ BU" and the stream-specific backup lookup table 209 is a secondary backup lookup table "$2^{nd}$ BU". The primary backup lookup table "$1^{st}$ BU" is used in lieu of the stream-specific management lookup table 207 in cases where the functional entity 121 cannot be used for transmitting the data stream DS_1. As can be seen from FIG. 2, the primary backup lookup table "$1^{st}$ BU" 208 contains egress port identifiers which refer to the egress ports TX_3 and TX_4 that belong to the functional entity 122 shown in FIG. 1. Thus, the data stream DS_1 is processed, e.g. shaped, and transmitted by the functional entity 122 when the functional entity 121 cannot be used. The secondary backup lookup table "$2^{nd}$ BU" is used in lieu of the stream-specific management lookup table 207 and the primary backup lookup table "$1^{st}$ BU" 208 in cases where neither of the functional entities 121 and 122 can be used for processing and transmitting the data stream DS_1. As can be seen from FIG. 2, the secondary backup lookup table "$2^{nd}$ BU" 209 contains egress port identifiers which refer to the egress port TX_5 that belongs to the functional entity 123 shown in FIG. 1. Thus, the data stream DS_1 is processed and transmitted by the functional entity 123 when the functional entities 121 and 122 cannot be used. Concerning the data stream DS_2, the management rule 204 comprises stream-specific backup lookup tables 211 and 212 so that the stream-specific backup lookup table 211 is the primary backup lookup table "$1^{st}$ BU" and the stream-specific backup lookup table 212 is the secondary backup lookup table "$2^{nd}$ BU". In the above-presented exemplifying case, two backup functional entities are defined for each data stream to be processed. In a general case, it is possible to define more than two backup functional entities for each data stream to be processed.

Figure 3:
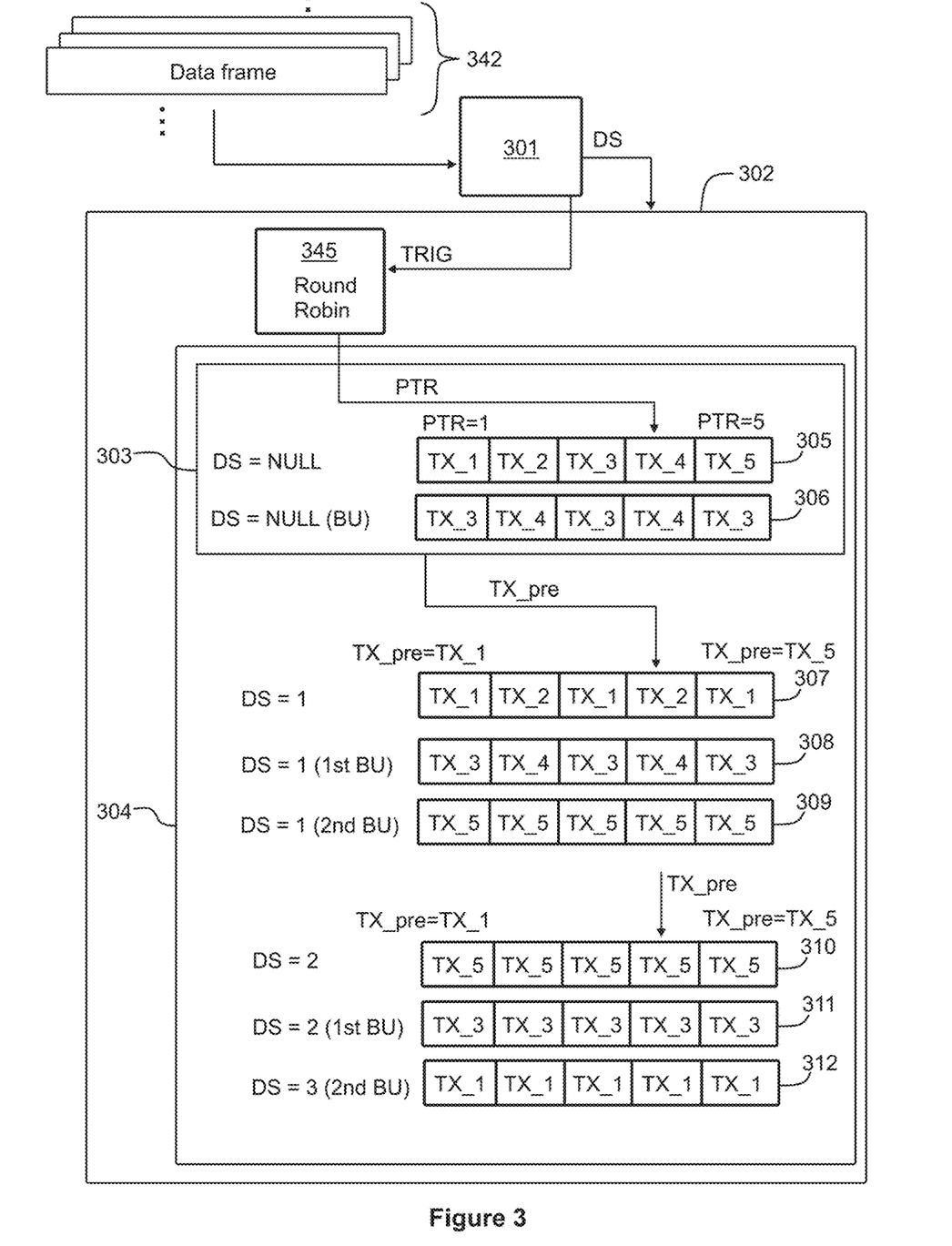
FIG. 3 illustrates the operation of a transmission control system according to another exemplifying and non-limiting embodiment of the invention.

FIG. 3 illustrates the operation of a transmission control system according to another exemplifying and non-limiting embodiment of the invention. For the sake of illustrative purposes, it is assumed that data frames 342 belong to data traffic DT that is transferred via a link aggregation group "LAG" having egress ports in multiple functional entities, e.g. line cards, of a network element. The transmission control system comprises a detection mechanism 301 for detecting whether each of the data frames 342 belongs to any of data streams DS_1 and DS_2 to be processed, e.g. shaped. The transmission control system comprises a forwarding-control mechanism 302 for controlling those of the data frames 342 belonging to none of the data streams DS_1 and DS_2 to be forwarded to the functional entities so that these data frames are distributed between the functional entities according to a link aggregation rule 303 related to the link aggregation group. The forwarding-control mechanism 302 is configured to maintain a management rule 304 that indicates, for each of the data streams DS_1 and DS_2, a stream-specific functional entity that is one of the functional entities and is configured to run each of one or more management processes to be directed to the data stream under consideration. The forwarding-control mechanism 302 is configured to control, in accordance with the management rule 304, the data frames belonging to the data stream DS_1 or DS_2 to be forwarded to the stream-specific functional entity related to the data stream under consideration.

In the exemplifying case illustrated in FIG. 3, the detection mechanism 301 is configured to produce an indicator DS which is NULL if a data frame under consideration belongs to none of the data streams DS_1 and DS_2, which is 1 if the data frame belongs to the data stream DS_1, and which is 2 if the data frame belongs to the data stream DS_2. Furthermore, for each data frame, the detection mechanism 301 is configured to produce a trigger signal TRIG that orders a Round-Robin mechanism 345 to change its output. The Round-Robin mechanism 345 outputs a pointer PTR whose value periodically repeats predetermined discrete values such as e.g. 1, 2, 3, 4, and 5. For example, in a case where PTR=2, the trigger signal TRIG causes the PTR to be changed to 3, and in a case where PTR=5, the trigger signal TRIG causes the PTR to be changed to 1.

In the exemplifying case illustrated in FIG. 3, the link aggregation rule 303 is implemented with a link aggregation lookup table 305. In an exemplifying situation where a data frame belongs to the data traffic DT but neither of the data streams DS_1 and DS_2, i.e. DS=NULL, the forwarding-control mechanism 302 retrieves an egress port identifier from the link aggregation lookup table 305 on the basis of data related to the data frame. In this exemplifying case, the above-mentioned pointer PTR represents the data related to the data frame. In the exemplifying situation shown in FIG. 3, the pointer PTR is 4, and thus the data frame is forwarded to the egress port TX_4 that belongs to the functional entity 122 shown in FIG. 1. The link aggregation rule 303 comprises advantageously one or more backup link aggregation lookup tables each of which can be used in lieu of the link aggregation lookup table 305 in situations where one or more of the functional entities cannot be used for transmitting data.

In the exemplifying case illustrated in FIG. 3, the management rule 304 is implemented with the link aggregation lookup table 305 and with stream-specific auxiliary lookup tables 307 and 310. The stream-specific auxiliary lookup table 307 relates to the data stream DS_1, and the stream-specific auxiliary lookup table 310 relates to the data stream DS_2. The forwarding-control mechanism 302 is configured to retrieve, for each data frame belonging to the data stream DS_1 or DS_2, a preliminary egress port identifier TX_pre from the link aggregation lookup table 305 on the basis of the pointer PTR and subsequently to retrieve an egress port identifier from the stream-specific auxiliary lookup table corresponding to the data stream under consideration on the basis of the preliminary egress port identifier TX_pre. As can be seen from FIG. 3, the stream-specific auxiliary lookup table 307 contains egress port identifiers which refer to the egress ports TX_1 and TX_2 that belong to the functional entity 121 shown in FIG. 1. Thus, the data stream DS_1 is processed, e.g. shaped, and transmitted by the functional entity 121. Correspondingly, the stream-specific auxiliary lookup table 310 contains egress port identifiers which refer to the egress port TX_5 that belongs to the functional entity 123 shown in FIG. 1. Thus, the data stream DS_2 is processed and transmitted by the functional entity 123.

In an exemplifying situation where a data frame belongs to the data stream DS_1, i.e. DS=1, the forwarding-control mechanism 302 retrieves the preliminary egress port identifier TX_pre from the link aggregation lookup table 305 on the basis of the pointer PTR and subsequently 302 retrieves the egress port identifier from the stream-specific auxiliary lookup table 307 on the basis of the preliminary egress port identifier TX_pre. In the exemplifying situation shown in FIG. 3, the pointer PTR is 4, and thus the preliminary egress port identifier TX_pre is TX_4 and thus the data frame is forwarded to the egress port TX_2 that belongs to the functional entity 121 shown in FIG. 1.

The management rule 304 indicates advantageously, but not necessarily, a group of backup entities for each of the data streams DS_1 and DS_2. Each of the backup entities related to the data stream DS_1 is configured to run each of the one or more management processes, e.g. shaping, to be directed to the data stream DS_1, and each of the backup entities related to the data stream DS_2 is configured to run each of the one or more management processes to be directed to the data stream DS_2. The management rule 304 indicates a backup order in which the backup entities related to the data stream DS_1 are to be used in lieu of the functional entity 121 for processing and transmitting the data stream DS_1, and a backup order in which the backup entities related to the data stream DS_2 are to be used in lieu of the functional entity 123 for processing and transmitting the data stream DS_2. The forwarding-control mechanism 302 is configured to control, in response to a switchover to a backup entity, data frames belonging to an appropriate data stream to be forwarded to the backup entity in accordance with the management rule 304. In the exemplifying case illustrated in FIG. 3, the management rule 304 comprises stream-specific backup lookup tables 308 and 309 related to the data stream DS_1 so that the stream-specific backup lookup table 308 is a primary backup lookup table "1$^{st}$ BU" and the stream-specific backup lookup table 309 is a secondary backup lookup table "2$^{nd}$ BU" The primary backup lookup table "1$^{st}$ BU" is used in lieu of the stream-specific management lookup table 307 in cases where the functional entity 121 cannot be used for transmitting the data stream DS_1. As can be seen from FIG. 3, the primary backup lookup table "1$^{st}$ BU" 308 contains egress port identifiers which refer to the egress ports TX_3 and TX_4 that belong to the functional entity 122 shown in FIG. 1. Thus, the data stream DS_1 is processed, e.g. shaped, and transmitted by the functional entity 122 when the functional entity 121 cannot be used. The secondary backup lookup table "2$^{nd}$ BU" is used in lieu of the stream-specific management lookup table 307 and the primary backup lookup table "1$^{st}$ BU" 308 in cases where neither of the functional entities 121 and 122 can be used for transmitting the data stream DS_1. As can be seen from FIG. 3, the secondary backup lookup table "2$^{nd}$ BU" 309 contains egress port identifiers which refer to the egress port TX_5 that belongs to the functional entity 123 shown in FIG. 1. Thus, the data stream DS_1 is processed, e.g. shaped, and transmitted by the functional entity 123 when the functional entities 121 and 122 cannot be used. Concerning the data stream DS_2, the management rule 304 comprises stream-specific backup lookup tables 311 and 312 so that the stream-specific backup lookup table 311 is the primary backup lockup table "1$^{st}$ BU" and the stream-specific backup lookup table 312 is the secondary backup lookup table "2$^{nd}$ BU".

Figure 4:
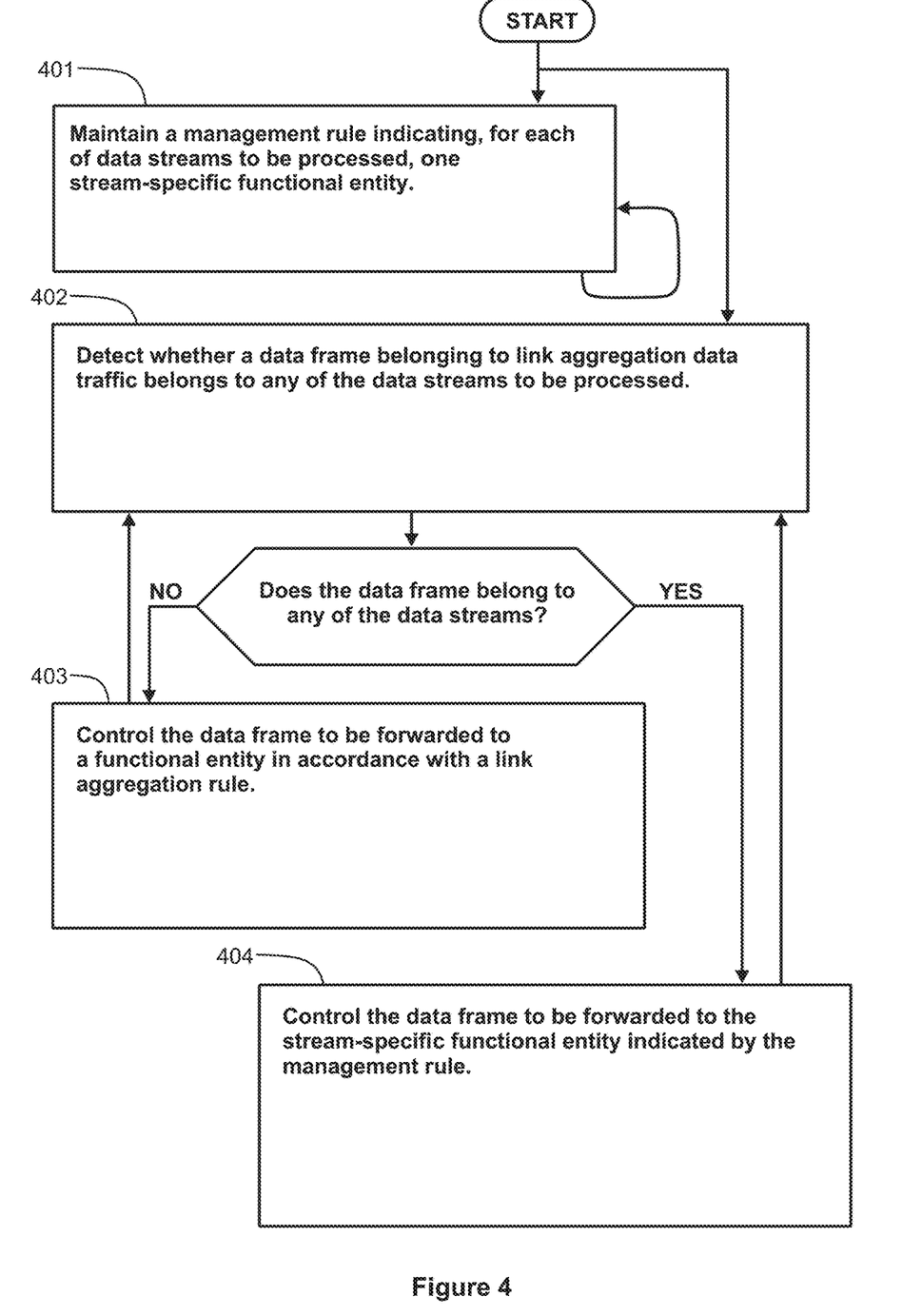
FIG. 4 shows a flowchart of a method according to an exemplifying and non-limiting embodiment of the invention for controlling management processes, such as shaping, in conjunction with link aggregation.

FIG. 4 shows a flowchart of a method for controlling one or more management processes directed to one or more data streams each being a part of data traffic transmitted via a link aggregation group having egress ports in multiple functional entities of a network element. The method comprises the following actions:

action 401: maintaining a management rule that indicates, for each of the data streams, a stream-specific functional entity that is one of the functional entities and is configured to run each of one or more management processes to be directed to the data stream under consideration, action 402: detecting, for each of data frames belonging to the above-mentioned data traffic, whether the data frame under consideration belongs to any of the data streams, action 403: controlling the data frames belonging to none of the data streams to be forwarded to the functional entities so that these data frames are distributed between the functional entities according to a link aggregation rule related to the link aggregation group, and action 404: controlling, in accordance with the management rule, the data frames belonging to one of the data streams to be forwarded to the stream-specific functional entity related to the one of the data streams.

A method according to an exemplifying and non-limiting embodiment of the invention further comprises:

maintaining the management rule to indicate, for at least the one of the data streams, a backup entity from among the functional entities, the backup entity being configured to run each of the one or more management processes to be directed to the one of the data streams and being capable of operating in lieu of the stream-specific functional entity related to the one of the data streams, and controlling, in response to a switchover to the backup entity, the data frames belonging to the one of the data streams to be forwarded to the backup entity.

A method according to an exemplifying and non-limiting embodiment of the invention further comprises:

maintaining the management rule to indicate, for at least the one of the data streams, a group of backup entities from among the functional entities, each of the backup entities being configured to run each of the one or more management processes to be directed to the one of the data streams, maintaining the management rule to indicate a backup order in which the backup entities are to be used in lieu of the stream-specific functional entity related to the one of the data streams, and controlling, in response to a switchover to one of the backup entities, the data frames belonging to the one of the data streams to be forwarded to the one of the backup entities.

In a method according to an exemplifying and non-limiting embodiment of the invention, the detecting whether the data frame under consideration belongs to any of the data streams is based on data related to the data frame under consideration.

In a method according to an exemplifying and non-limiting embodiment of the invention, the data related to the data frame under consideration comprises at least one of the following data items read from the data frame: an Internet Protocol destination address "IP DA", an Internet Protocol source address "IP SA", an indicator of a label switched path "LSP" of multiprotocol label switching "MPLS", and/or an indicator of a virtual local access network "VLAN".

In a method according to an exemplifying and non-limiting embodiment of the invention, the link aggregation rule is implemented with a link aggregation lookup table. In this exemplifying case, the method comprises retrieving, for each of the data frames belonging to none of the data streams, an egress port identifier from the link aggregation lookup table on the basis of the data related to the data frame under consideration.

In a method according to an exemplifying and non-limiting embodiment of the invention, the management rule is implemented with one or more stream-specific management lookup tables. In this exemplifying case, the method comprises retrieving, for each of the data frames belonging to one of the data streams and on the basis of the data related to the data frame under consideration, an egress port identifier from the stream-specific management lookup table corresponding to the one of the data streams.

In a method according to an exemplifying and non-limiting embodiment of the invention, the management rule is implemented with the above-mentioned link aggregation lookup table and with one or more stream-specific auxiliary lookup tables. In this exemplifying case, the method comprises retrieving, for each of the data frames belonging to one of the data streams and on the basis of the data related to the data frame under consideration, a preliminary egress port identifier from the link aggregation lookup table and subsequently retrieving, for the data frame under consideration and on the basis of the preliminary egress port identifier, an egress port identifier from the stream-specific auxiliary lookup table corresponding to the one of the data streams.

In a method according to an exemplifying and non-limiting embodiment of the invention, the one or more management processes comprises at least one of the following: shaping directed to one of the data streams so as to control the temporal rate profile of the one of the data streams, deep packet inspection directed to one of the data streams so as to monitor the content of the one of the data streams, and/or intrusion detection directed to one of the data streams so as to monitor the integrity of the one of the data streams.

A computer program according to an exemplifying and non-limiting embodiment of the invention comprises computer executable instructions for controlling a programmable processing system to carry out actions related to a method according to any of the above-described exemplifying embodiments of the invention.

A computer program according to an exemplifying and non-limiting embodiment of the invention comprises software modules for controlling one or more management processes directed to one or more data streams each being a part of data traffic transmitted via a link aggregation group having egress ports in multiple functional entities of a network element. The software modules comprise computer executable instructions for controlling a programmable processing system to:

maintain a management rule that indicates, for each of the data streams, a stream-specific functional entity that is one of the functional entities and is configured to run each of one or more management processes to be directed to the data stream under consideration, detect, for each of data frames belonging to the above-mentioned data traffic, whether the data frame under consideration belongs to any of the data streams, control the data frames belonging to none of the data streams to be forwarded to the functional entities so that these data frames are distributed between the functional entities according to a link aggregation rule related to the link aggregation group, and control, in accordance with the management rule, the data frames belonging to one of the data streams to be forwarded to the stream-specific functional entity related to the one of the data streams.

The above-mentioned software modules can be e.g. subroutines or functions implemented with a suitable programming language and with a compiler suitable for the programming language and the programmable processing system under consideration. It is worth noting that also a source code corresponding to a suitable programming language represents the computer executable software modules because the source code contains the information needed for controlling the programmable processing system to carry out the above-presented actions and compiling changes only the format of the information. Furthermore, it is also possible that the programmable processing system is provided with an interpreter so that a source code implemented with a suitable programming language does not need to be compiled prior to running.

A computer program product according to an exemplifying and non-limiting embodiment of the invention comprises a computer readable medium, e.g. a compact disc "CD", encoded with a computer program according to an embodiment of invention.

A signal according to an exemplifying and non-limiting embodiment of the invention is encoded to carry information defining a computer program according to an embodiment of invention.

The specific examples provided in the description given above should not be construed as limiting the scope and/or the applicability of the appended claims. Lists and groups of examples provided in the description given above are not exhaustive unless otherwise explicitly stated.

What is claimed is:

1. A transmission control system for controlling one or more management processes directed to one or more data streams each being a part of data traffic transmitted via a link aggregation group having egress ports in multiple functional entities of a network element, the transmission control system comprising:

a detection mechanism for detecting, for each of data frames belonging to the data traffic, whether the data frame under consideration belongs to any of the data streams, and a forwarding-control mechanism for controlling the data frames belonging to none of the data streams to be forwarded to the functional entities so that these data frames are distributed between the functional entities according to a link aggregation rule related to the link aggregation group, wherein the forwarding-control mechanism is configured to:

maintain a management rule indicating, for each of the data streams, a stream-specific functional entity, the stream-specific functional entity being one of the functional entities and being configured to run each of the one or more management processes to be directed to the data stream under consideration, and control, in accordance with the management rule, the data frames belonging to one of the data streams to be forwarded to the stream-specific functional entity related to the one of the data streams, wherein the link aggregation rule is implemented with a link aggregation lookup table, and the forwarding-control mechanism is configured to retrieve, for each of the data frames belonging to none of the data streams, an egress port identifier from the link aggregation lookup table on the basis of data related to the data frame under consideration, and wherein the management rule is implemented with the link aggregation lookup table and with one or more stream-specific auxiliary lookup tables, and the forwarding-control mechanism is configured to retrieve, for each of the data frames belonging to one of the data streams and on the basis of data related to the data frame under consideration, a preliminary egress port identifier from the link aggregation lookup table and to retrieve, for the data frame under consideration and on the basis of the preliminary egress port identifier, an egress port identifier from the stream-specific auxiliary lookup table corresponding to the one of the data streams.

2. A transmission control system according to claim 1, wherein the forwarding-control mechanism is configured to:
  maintain the management rule to indicate, for at least the one of the data streams, a backup entity from among the functional entities, the backup entity being configured to run each of the one or more management processes to be directed to the one of the data streams and being capable of operating in lieu of the stream-specific functional entity related to the one of the data streams, and
  control, in response to a switchover to the backup entity, the data frames belonging to the one of the data streams to be forwarded to the backup entity.

3. A transmission control system according to claim 1, wherein the forwarding-control mechanism is configured to:
  maintain the management rule to indicate, for at least the one of the data streams, a group of backup entities from among the functional entities, each of the backup entities being configured to run each of the one or more management processes to be directed to the one of the data streams,
  maintain the management rule to indicate a backup order in which the backup entities are to be used in lieu of the stream-specific functional entity related to the one of the data streams, and
  control, in response to a switchover to one of the backup entities, the data frames belonging to the one of the data streams to be forwarded to the one of the backup entities.

4. A transmission control system according to claim 1, wherein the detection mechanism is configured to detect, for each of the data frames of the data traffic, whether the data frame under consideration belongs to any of the data streams on the basis of data related to the data frame under consideration.

5. A transmission control system according to claim 4, wherein the data related to the data frame under consideration comprises at least one of the following data items read from the data frame: an Internet Protocol destination address, an Internet Protocol source address, an indicator of a label switched path of multiprotocol label switching, an indicator of a virtual local access network.

6. A transmission control system according to claim 1, wherein the management rule is implemented with one or more stream-specific management lookup tables, and the forwarding-control mechanism is configured to retrieve, for each of the data frames belonging to one of the data streams and on the basis of data related to the data frame under consideration, an egress port identifier from the stream-specific management lookup table corresponding to the one of the data streams.

7. A network element for a data transfer network, the network element comprising:
  functional entities capable of transferring data between each other, at least one of the functional entities being capable of receiving data from the data transfer network and at least two of the functional entities being capable of transmitting data to the data transfer network and running one or more management processes directed to one or more data streams each being a part of data traffic transmitted via a link aggregation group having egress ports in multiple ones of the two or more functional entities, and
  a transmission control system for controlling the one or more management processes,
wherein the transmission control system comprises:
  a detection mechanism for detecting, for each of data frames belonging to the data traffic, whether the data frame under consideration belongs to any of the data streams, and
  a forwarding-control mechanism for controlling the data frames belonging to none of the data streams to be forwarded to the functional entities so that these data frames are distributed between the functional entities according to a link aggregation rule related to the link aggregation group,
wherein the forwarding-control mechanism is configured to:
  maintain a management rule indicating, for each of the data streams, a stream-specific functional entity, the stream-specific functional entity being one of the functional entities and being configured to run each of the one or more management processes to be directed to the data stream under consideration, and
  control, in accordance with the management rule, the data frames belonging to one of the data streams to be forwarded to the stream-specific functional entity related to the one of the data streams, and
wherein the one or more management processes comprises at least one of the following:
  shaping directed to one of the data streams so as to control a temporal rate profile of the one of the data streams,
  deep packet inspection directed to one of the data streams so as to monitor content of the one of the data streams,
  intrusion detection directed to one of the data streams so as to monitor integrity of the one of the data streams.

8. A network element according to claim 7, wherein the network element is at least one of the following: an Internet Protocol IP router, a MultiProtocol Label Switching MPLS switch, a packet optical switch, an Ethernet switch, a software-defined networking "SDN" controlled network element.

9. A method for controlling one or more management processes directed to one or more data streams each being a part of data traffic transmitted via a link aggregation group having egress ports in multiple functional entities of a network element, the method comprising:
  detecting, for each of data frames belonging to the data traffic, whether the data frame under consideration belongs to any of the data streams,
  controlling the data frames belonging to none of the data streams to be forwarded to the functional entities so that these data frames are distributed between the functional entities according to a link aggregation rule related to the link aggregation group, maintaining a management rule indicating, for each of the data streams, a stream- specific functional entity, the stream-specific functional entity being one of the functional entities and being configured to run each of the one or more management processes to be directed to the data stream under consideration, and controlling, in accordance with the management rule, the data frames belonging to one of the data streams to be forwarded to the stream-specific functional entity related to the one of the data streams, maintaining the management rule to indicate, for at least the one of the data streams, a backup entity from among the functional entities, the backup entity being configured to run each of the one or more management processes to be directed to the one of the data streams and being capable of operating in lieu of the stream-specific functional entity related to the one of the data streams, and controlling, in response to a switchover to the backup entity, the data frames belonging to the one of the data streams to be forwarded to the backup entity.

10. A method according to claim 9, wherein the detecting whether the data frame under consideration belongs to any of the data streams is based on data related to the data frame under consideration.

11. A method according to claim 10, wherein the data related to the data frame under consideration comprises at least one of the following data items read from the data frame: an Internet Protocol destination address, an Internet Protocol source address, an indicator of a label switched path of multiprotocol label switching, an indicator of a virtual local access network.

12. A method according to claim 9, wherein the management rule is implemented with one or more streams-specific management lookup tables, and the method comprises retrieving, for each of the data frames belonging to one of the data streams and on the basis of data related to the data frame under consideration, an egress port identifier from the stream-specific management lookup table corresponding to the one of the data streams.

13. A method according to claim 9, wherein the one or more management processes comprises at least one of the following: shaping directed to one of the data streams so as to control a temporal rate profile of the one of the data streams, deep packet inspection directed to one of the data streams so as to monitor content of the one of the data streams, intrusion detection directed to one of the data streams so as to monitor integrity of the one of the data streams.

14. A method for controlling one or more management processes directed to one or more data streams each being a part of data traffic transmitted via a link aggregation group having egress ports in multiple functional entities of a network element, the method comprising:

detecting, for each of data frames belonging to the data traffic, whether the data frame under consideration belongs to any of the data streams, controlling the data frames belonging to none of the data streams to be forwarded to the functional entities so that these data frames are distributed between the functional entities according to a link aggregation rule related to the link aggregation group, maintaining a management rule indicating, for each of the data streams, a stream- specific functional entity, the stream-specific functional entity being one of the functional entities and being configured to run each of the one or more management processes to be directed to the data stream under consideration, controlling, in accordance with the management rule, the data frames belonging to one of the data streams to be forwarded to the stream-specific functional entity related to the one of the data streams, maintaining the management rule to indicate, for at least the one of the data streams, a group of backup entities from among the functional entities, each of the backup entities being configured to run each of the one or more management processes to be directed to the one of the data streams, maintaining the management rule to indicate a backup order in which the backup entities are to be used in lieu of the stream-specific functional entity related to the one of the data streams, and controlling, in response to a switchover to one of the backup entities, the data frames belonging to the one of the data streams to be forwarded to the one of the backup entities.

15. A method according to claim 14, wherein the detecting whether the data frame under consideration belongs to any of the data streams is based on data related to the data frame under consideration.

16. A method according to claim 15, wherein the data related to the data frame under consideration comprises at least one of the following data items read from the data frame:

an Internet Protocol destination address,
an Internet Protocol source address,
an indicator of a label switched path of multiprotocol label switching,
an indicator of a virtual local access network.

17. A method according to claim 14, wherein the one or more management processes comprises at least one of the following:

shaping directed to one of the data streams so as to control a temporal rate profile of the one of the data streams,
deep packet inspection directed to one of the data streams so as to monitor content of the one of the data streams,
intrusion detection directed to one of the data streams so as to monitor integrity of the one of the data streams.

18. A method for controlling one or more management processes directed to one or more data streams each being a part of data traffic transmitted via a link aggregation group having egress ports in multiple functional entities of a network element, the method comprising:

detecting, for each of data frames belonging to the data traffic, whether the data frame under consideration belongs to any of the data streams, controlling the data frames belonging to none of the data streams to be forwarded to the functional entities so that these data frames are distributed between the functional entities according to a link aggregation rule related to the link aggregation group, maintaining a management rule indicating, for each of the data streams, a stream-specific functional entity, the stream-specific functional entity being one of the functional entities and being configured to run each of the one or more management processes to be directed to the data stream under consideration, and controlling, in accordance with the management rule, the data frames belonging to one of the data streams to be forwarded to the stream-specific functional entity related to the one of the data streams, wherein the link aggregation rule is implemented with a link aggregation lookup table, and the method comprises retrieving, for each of the data frames belonging to none of the data streams, an egress port identifier from the link aggregation lookup table on the basis of data related to the data frame under consideration, and wherein the management rule is implemented with the link aggregation lookup table and with one or more stream-specific auxiliary lookup tables, and the method comprises retrieving, for each of the data frames belonging to one of the data streams and on the basis of data related to the data frame under consideration, a preliminary egress port identifier from the link aggregation lookup table and retrieving, for the data frame under consideration and on the basis of the preliminary egress port identifier, an egress port identifier from the stream-specific auxiliary lookup table corresponding to the one of the data streams.

19. A method according to claim 18, wherein the detecting whether the data frame under consideration belongs to any of the data streams is based on data related to the data frame under consideration.

20. A method according to claim 19, wherein the data related to the data frame under consideration comprises at least one of the following data items read from the data frame:
    an Internet Protocol destination address,
    an Internet Protocol source address,
    an indicator of a label switched path of multiprotocol label switching,
    an indicator of a virtual local access network.

21. A method according to claim 18, wherein the one or more management processes comprises at least one of the following:
    shaping directed to one of the data streams so as to control a temporal rate profile of the one of the data streams,
    deep packet inspection directed to one of the data streams so as to monitor content of the one of the data streams,
    intrusion detection directed to one of the data streams so as to monitor integrity of the one of the data streams.

22. A method for controlling one or more management processes directed to one or more data streams each being a part of data traffic transmitted via a link aggregation group having egress ports in multiple functional entities of a network element, the method comprising:
    detecting, for each of data frames belonging to the data traffic, whether the data frame under consideration belongs to any of the data streams,
    controlling the data frames belonging to none of the data streams to be forwarded to the functional entities so that these data frames are distributed between the functional entities according to a link aggregation rule related to the link aggregation group,
    maintaining a management rule indicating, for each of the data streams, a stream-specific functional entity, the stream-specific functional entity being one of the functional entities and being configured to run each of the one or more management processes to be directed to the data stream under consideration, and
    controlling, in accordance with the management rule, the data frames belonging to one of the data streams to be forwarded to the stream-specific functional entity related to the one of the data streams,
    wherein the one or more management processes comprises at least one of the following:
        shaping directed to one of the data streams so as to control a temporal rate profile of the one of the data streams,
        deep packet inspection directed to one of the data streams so as to monitor content of the one of the data streams,
        intrusion detection directed to one of the data streams so as to monitor integrity of the one of the data streams.

23. A method according to claim 22, wherein the detecting whether the data frame under consideration belongs to any of the data streams is based on data related to the data frame under consideration, and wherein the data related to the data frame under consideration comprises at least one of the following data items read from the data frame:
    an Internet Protocol destination address,
    an Internet Protocol source address,
    an indicator of a label switched path of multiprotocol label switching,
    an indicator of a virtual local access network.

* * * * *